(12) United States Patent
Mikawa (10) Patent No.: US 10,868,970 B2
(45) Date of Patent: Dec. 15, 2020

(54) IMAGE PROCESSING APPARATUS OUTPUTTING DISPLAY ENVIRONMENT, IMAGE PROCESSING METHOD, AND STORAGE MEDIUM

(71) Applicant: CANON KABUSHIKI KAISHA, Tokyo (JP)

(72) Inventor: Takuma Mikawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/529,627

(22) Filed: Aug. 1, 2019

(65) Prior Publication Data
US 2020/0053272 A1 Feb. 13, 2020

(30) Foreign Application Priority Data
Aug. 7, 2018 (JP) ................. 2018-148447

(51) Int. Cl.
*H04N 5/235* (2006.01)
*H04N 1/387* (2006.01)
*H04N 9/64* (2006.01)

(52) U.S. Cl.
CPC ......... *H04N 5/2355* (2013.01); *H04N 1/3871* (2013.01); *H04N 9/646* (2013.01)

(58) Field of Classification Search
CPC .... B60R 2001/1253; B60R 2001/1215; H04N 5/2355; H04N 5/35581; H04N 3/155; H04N 5/35527; H04N 5/35554; H04N 5/374; H04N 5/378; H04N 5/76; H04N 5/85; H04N 9/64; H04N 9/8205; H04N 9/87; H04N 17/02; H04N 1/3871; H04N 1/6058; H04N 1/622; H04N 21/431; H04N 21/4318; H04N 21/43635; H04N 21/4854;
(Continued)

(56) References Cited

U.S. PATENT DOCUMENTS 7,312,824 B2 12/2007 Takano
9,319,652 B2 4/2016 Atkins
(Continued)

FOREIGN PATENT DOCUMENTS

JP 2004-328532 A 11/2004
JP 2015-5878 A 1/2015
JP 2017-143546 A 8/2017

*Primary Examiner* — Negussie Worku
(74) *Attorney, Agent, or Firm* — Canon U.S.A., Inc. IP Division (57) ABSTRACT

An image processing apparatus includes a processing unit, a setting acquisition unit, an environment acquisition unit, and an output unit. The processing unit is configured to perform image processing on an input image. The setting acquisition unit is configured to acquire information indicating a setting of the image processing on an image with a predetermined dynamic range. The environment acquisition unit is configured to acquire information indicating a display environment in which the image is displayed during the image processing. The output unit is configured to output at least the information indicating the setting and the information indicating the display environment in association with the image having undergone the image processing. The processing unit, the setting acquisition unit, the environment acquisition unit, and the output unit are implemented via at least one processor.

20 Claims, 5 Drawing Sheets

(58) Field of Classification Search
CPC .. H04N 5/2256; H04N 5/2352; H04N 5/2353;
H04N 5/2354; H04N 5/272; H04N 5/32;
H04N 5/445; H04N 9/646; H04N 9/67;
G09G 5/10; G09G 2320/0626; G09G
2370/042; G09G 2320/0242; G09G
2320/0646; G09G 2320/0666; G09G
2340/02; G09G 2340/0428; G09G
2354/00; G09G 2360/144; G09G
2360/16; G09G 5/00; G09G 5/005; G09G
5/02; G09G 5/026; G09G 5/04; G06T
5/009; G06T 2207/10016; G06T
2207/20208; G06T 5/00; G06T 5/007;
G06T 5/10; G06T 5/50; G11B 20/10
USPC ........................................................ 358/471
See application file for complete search history.

(56) References Cited

U.S. PATENT DOCUMENTS

| | | | | |
|---|---|---|---|---|
| 9,986,253 | B2 | 5/2018 | Yamamoto | |
| 10,009,588 | B2 | 6/2018 | Kitajima | |
| 10,063,823 | B2 * | 8/2018 | Uchimura | H04N 5/85 |
| 10,657,375 | B1 * | 5/2020 | Edwards | G10L 15/1815 |
| 2009/0256938 | A1 * | 10/2009 | Bechtel | H04N 5/374 348/302 |
| 2014/0210847 | A1 * | 7/2014 | Knibbeler | H04N 9/68 345/589 |
| 2015/0015487 | A1 * | 1/2015 | Nakayama | A63F 13/25 345/156 |
| 2015/0279113 | A1 * | 10/2015 | Knorr | G06T 7/11 345/633 |
| 2016/0275913 | A1 * | 9/2016 | Nagashima | G06T 5/009 |
| 2018/0299952 | A1 * | 10/2018 | Koker | G06T 7/80 |
| 2019/0124247 | A1 * | 4/2019 | Behrooz | H04N 5/32 |
| 2019/0139203 | A1 * | 5/2019 | Yokota | G09G 5/005 |
| 2019/0139502 | A1 | 5/2019 | Onozawa | |
| 2019/0244584 | A1 * | 8/2019 | Fujita | G09G 5/026 |
| 2019/0279598 | A1 * | 9/2019 | Mito | H04N 9/67 |
| 2019/0355107 | A1 * | 11/2019 | Aoki | G09G 5/00 |

* cited by examiner

IMAGE PROCESSING APPARATUS OUTPUTTING DISPLAY ENVIRONMENT, IMAGE PROCESSING METHOD, AND STORAGE MEDIUM

BACKGROUND

Field

One disclosed aspect of the embodiments relates to an image processing technique for displaying an image that has been edited, adjusted, and the like.

Description of the Related Art

Conventionally, display devices and general image formats handle image data in, for example, standard red, green, blue (sRGB) standard and Rec. ITU-R BT.709 standard. A recommended luminance level for reference displays under these standards is 80 to 100 candela per square meter ($cd/m^2$).

In these days, there are formulated standards, such as Rec. ITU-R BT.2100 standard, with luminance ranges (i.e., dynamic ranges) that are wider than the ranges of the conventional standards. For example, a transfer function called perceptual quantization (PQ) defined in Rec. ITU-R BT.2100 allows representations up to 10000 $cd/m^2$. Along with these standards, display devices that can perform display with wider dynamic ranges (e.g., up to 1000 $cd/m^2$) than the dynamic ranges of conventional display devices are available. Hereinafter, an image with a conventional standard dynamic range will be called a "standard dynamic range (SDR) image", whereas an image with a wider dynamic range than that of the SDR image will be called a "high dynamic range (HDR) image".

On the other hand, there are RAW image files in which original data (i.e., RAW data or RAW image) obtained from imaging elements arranged in the Bayer array is recorded without any change. Since a RAW image has a wider dynamic range than that of a SDR image, the RAW image can be handled as an HDR image by subjecting the RAW image to a development processing under development conditions for outputting HDR images (i.e., development parameters for HDR).

As an image processing apparatus that handles HDR images, Japanese Patent Application Laid-Open No. 2015-5878 discusses a method for handling HDR image data and image data in which conversion information from HDR to SDR is recorded. According to the method described in Japanese Patent Application Laid-Open No. 2015-5878, if the display device is capable of HDR display, an HDR image is displayed, and if the display device is compatible with only SDR display, the HDR image is converted to an SDR image for display. As described above, according to the technique described in Japanese Patent Application Laid-Open No. 2015-5878, it is possible to display the HDR image in accordance with the display environment even in the case of SDR display environment.

Even when HDR image data without SDR conversion information is handled, it is possible to display the HDR image in the SDR display environment by converting the HDR image into an SDR image by tone mapping or the like.

On the other hand, image processing is commonly performed on image data to perform editing or adjustments of color, brightness, and the like. At that time, the image data is saved in association with information indicating setting values that have been used when the editing and adjustments of color, brightness, and the like have been performed. Then, when the user views the image processing result, the image having undergone the image processing using the information such as the setting values saved in association with the image data is displayed.

In the case of subjecting an HDR image to image processing such as performing edits and adjustments in colors and brightness, there may occur inconsistencies in color and brightness if the displaying capability in the display environment used at the time of image processing and the displaying capability of the display environment used when displaying the image processing result are different from each other. In this case, it may be difficult for the user who views the image of the image processing result to understand the difference between the displaying capabilities. For example, when an HDR image having undergone image processing in the SDR display environment is viewed in the HDR display environment, it may be difficult for the user to understand whether there is a difference between the displaying capability at the time of image processing and the displaying capability at the time of display of the image processing result. In particular, this issue is more likely to occur when the person who performs the image processing (i.e., the person who performs adjustments to the color and brightness of the image) and the person who views the image processing result (i.e., the viewer) are different.

SUMMARY

One disclosed aspect of the embodiments is directed to an image processing apparatus, and an image processing method, and a storage medium that allow a user viewing the result of image processing to easily recognize the difference between the displaying capabilities, even if the displaying capability in the display environment differs between, for example, the time of image processing and the time of display of the image processing result.

According to an aspect of the embodiments, an image processing apparatus includes a processing unit, a setting acquisition unit, an environment acquisition unit, and an output unit. The processing unit is configured to perform image processing on an input image. The setting acquisition unit is configured to acquire information indicating a setting of the image processing on an image with a predetermined dynamic range. The environment acquisition unit is configured to acquire information indicating a display environment in which the image is displayed during the image processing. The output unit is configured to output at least the information indicating the setting and the information indicating the display environment in association with the image having undergone the image processing. The processing unit, the setting acquisition unit, the environment acquisition unit, and the output unit are implemented via at least one processor.

Further features of the disclosure will become apparent from the following description of exemplary embodiments with reference to the attached drawings.

DESCRIPTION OF THE EMBODIMENTS

Hereinafter, exemplary embodiments of the disclosure will be described in detail with reference to the attached drawings.

In a first exemplary embodiment, a personal computer (PC) application program (hereinafter referred to as an application) that handles a RAW image file as a high dynamic range (HDR) image will be described as an example. The application according to the present exemplary embodiment is an application capable of developing a RAW image file as an HDR image under development conditions (i.e., HDR development parameters) for outputting an HDR image. In the application according to the present exemplary embodiment, it is possible to provide, for example, graphical user Interfaces (GUI) for a file setting control and image processing control, and a GUI for an end button and others. In the image processing control, it is possible to set development conditions in RAW development processing, and set "brightness" and "color" in image editing and adjustment processing. In the image processing control, it is also possible to save, in association with the RAW image file, information on the setting values of development conditions in the RAW development processing and on the setting values of "brightness" and "color" in the image editing and adjustment processing.

In the application of the present exemplary embodiment, it is also possible to save, in association with a RAW image file, display environment information indicating display environments in which the RAW development processing and the image processing such as image editing and adjustments are performed. In the present exemplary embodiment, the setting values of development conditions in the RAW development processing (i.e., development parameters), the setting values in the image editing and adjustment processing, and the display environment information indicating the display environment having been used in the image processing will be collectively referred to as processing-related information. The processing-related information may be provided in a separate file from the RAW image file, and recorded in association with the RAW image file. In the present exemplary embodiment, the RAW image file is handled as an HDR image. However, instead of the RAW image, a general HDR image (e.g., a 10-bit image in BT.2020 color gamut with perceptual quantization (PQ) gamma) may be used.

Figure 1:
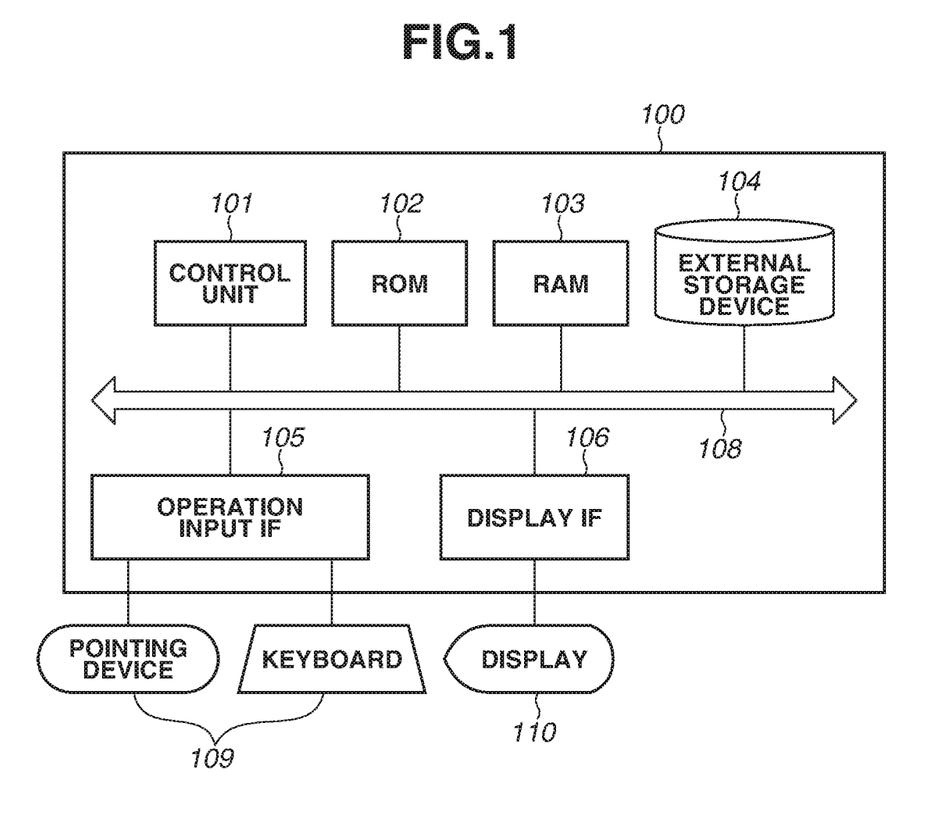
FIG. 1 is a block diagram illustrating a configuration example of an image processing apparatus.

FIG. 1 is a block diagram illustrating a schematic configuration of a personal computer (hereinafter referred to as a PC 100), which is an application example of an image processing apparatus of the first exemplary embodiment.

In FIG. 1, a control unit 101 controls the entire PC 100. The control unit 101 is, for example, a central processing unit (CPU).

A read only memory (ROM) 102 is a memory storing programs and parameters that do not need to be changed. A random access memory (RAM) 103 is a memory for temporarily storing programs and data supplied from an external device or the like.

An external storage device 104 includes a hard disk or memory card fixedly installed in the PC 100, various optical discs, magnetic cards, optical cards, and integrated circuit (IC) cards, which are detachable from the PC 100, and write/read devices for the media. The external storage device 104 can record digital data such as programs and RAW image files. In particular, in the external storage device 104 of the present exemplary embodiment, an image processing program described below is recorded as a program code or a set of instructions readable by the control unit 101. The control unit 101 executes the program code or the instructions to perform operations described in the following, such as the flowcharts shown in FIG. 2, 4, or 5. In the present exemplary embodiment, the image processing program is recorded in the external storage device 104 as an example. However, the disclosure is applied to a case where the program resides in the ROM 102 or on a network.

An operation input interface (IF) 105 is an interface to an input device such as a pointing device (e.g., mouse) and a keyboard 109 that accept a user's operation as operation input data.

A display Interface (IF) 106 is an interface with a display 110 for displaying data held by the PC 100 and supplied data.

A bus 108 is a system bus that communicably connects the individual units described above (i.e., the control unit 101, the ROM 102, the RAM 103, the external storage device 104, the operation input IF 105, and the display IF 106).

Next, operations of the image processing apparatus according to the present exemplary embodiment implemented by the PC 100 illustrated in FIG. 1 will be described.

Figure 2:
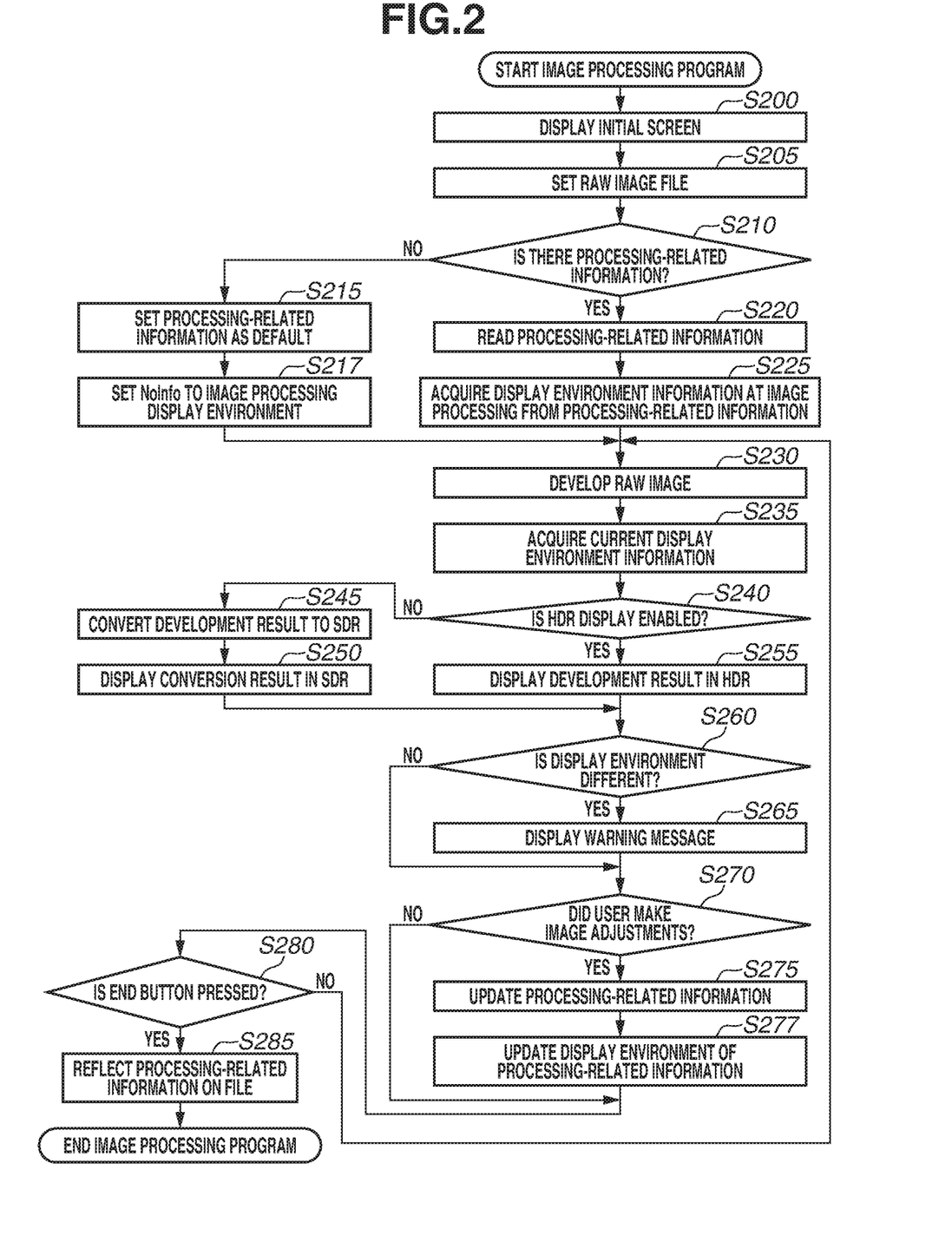
FIG. 2 is a flowchart illustrating a procedure performed based on an image processing program according to a first exemplary embodiment.

FIG. 2 is a flowchart illustrating a procedure of image processing of the present exemplary embodiment, which is implemented when the control unit 101 illustrated in FIG. 1 executes an image processing program, which is an application according to the present exemplary embodiment. The processing illustrated in the flowchart of FIG. 2 may be implemented not only by a software configuration based on the program executed by a CPU or the like but also by a hardware configuration. Further, a part of the processing may be implemented by a hardware configuration and the remaining part may be implemented by a software configuration. The program executed by the CPU may be stored in the external storage device 104 or may be stored, for example, in the ROM 102. The program may be acquired via a network or the like (not illustrated).

When the image processing program according to the present exemplary embodiment is started up, the control unit 101 first displays an initial screen of the image processing program in step S200. The process of the initial screen display is a process of displaying a window (not illustrated) in the same manner as a general application.

In step S205, the control unit 101 sets a RAW image file. The control unit 101 displays a GUI (not illustrated) for file setting control on the display 110. This allows the user to select the RAW image file stored in the external storage device 104 via the operation input IF 105. The GUI for the file setting control is configured to use, for example, a file open dialog provided as a standard in an operating system (OS) whereby one image file can be selected.

In step S210, the control unit 101 determines whether processing-related information is saved in association with the RAW image file selected in step S205. When determining that there is no associated processing-related information (NO in step S210), the control unit 101 shifts the processing to step S215. When determining that there is associated processing-related information (YES in step S210), the control unit 101 shifts the processing to step S220. In the present exemplary embodiment, since a RAW image is handled as an HDR image, the processing-related information includes "development parameters" that represent RAW development conditions.

A structure of a RAW image file according to the present exemplary embodiment will be described with reference to FIGS. 3A to 3C.

Figure 3A:
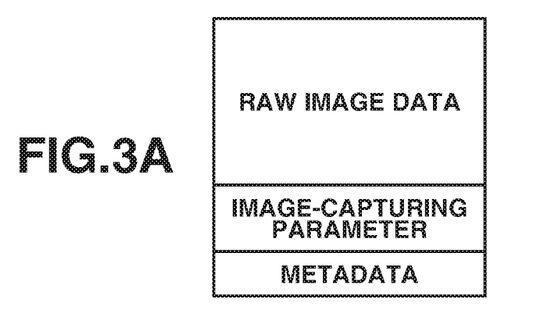
FIG. 3A is a block diagram illustrating a structure of a RAW image file.

FIG. 3A is a block diagram illustrating an example of a structure of a RAW image file. In FIG. 3A, RAW image data is RAW data obtained from imaging elements arranged in a Bayer array. The image-capturing parameters are various setting values for main image capturing, which indicate information such as exposure, shutter speed, color gamut, and white point. Metadata is information other than image-capturing parameters and development parameters, which indicate information such as image capture date and time, model name, and comments.

Figure 3B:
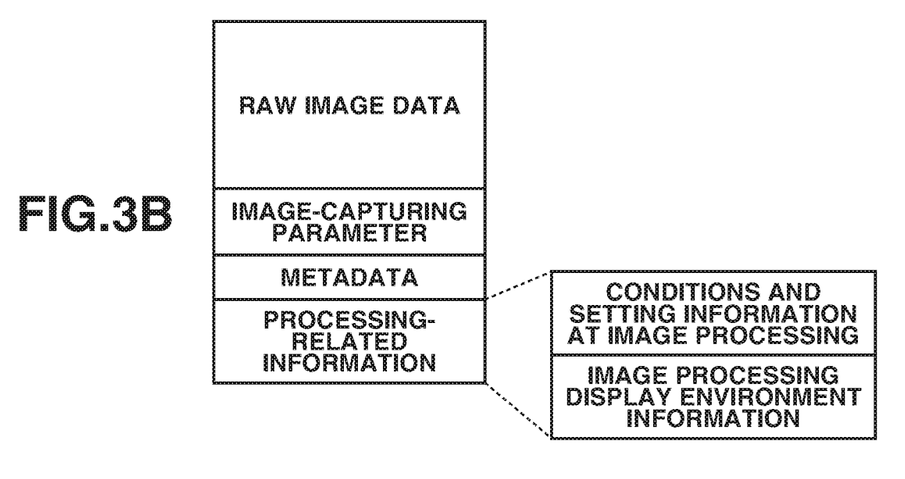
FIG. 3B is a block diagram illustrating a structure of a RAW image file to which processing-related information is added.

FIG. 3B is a block diagram illustrating a structure example of a RAW image file to which processing-related information is added. Raw image data, image-capturing parameters, and metadata are the same as those illustrated in FIG. 3A. The processing-related information includes condition/setting information at the time of image processing and display environment information at the time of image processing. The condition/setting information at the time of image processing includes at least development parameters for HDR and setting values for adjustment, editing, and the like. The HDR development parameters are parameters indicating development conditions for developing RAW image data and outputting an HDR image. The HDR development parameters include values of the dynamic range, color gamut, white point, sharpness, and noise reduction of the HDR image as a target. Developing using the HDR development parameters makes it possible to obtain image data of a wider luminance range and color gamut than conventional standard dynamic range (SDR). The setting values for adjustment, editing, and the like are information on, for example, adjustment setting values of color and brightness in which adjustment and editing of the color and brightness are made. The display environment information at the time of image processing is information indicating a display environment in which an image is displayed when development processing or image processing such as adjustment and editing has been performed. In the present exemplary embodiment, flag information indicating whether HDR display is enabled is used as the display environment information at the time of image processing.

Figure 3C:
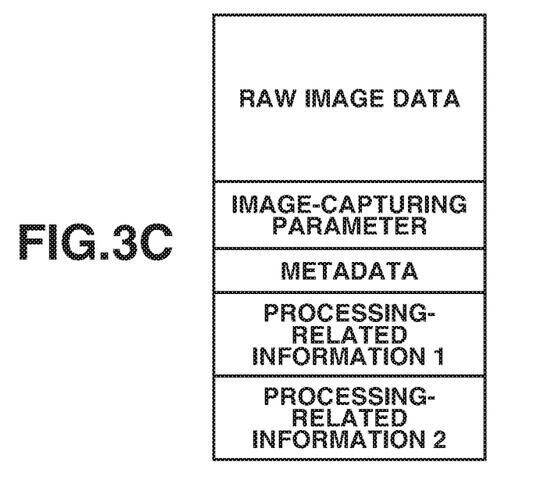
FIG. 3C is a block diagram illustrating a structure of a RAW image file having a plurality of pieces of processing-related information.

FIG. 3C is a block diagram illustrating a structure example of a RAW image file having a plurality of pieces of processing-related information. As illustrated in FIG. 3C, as information on another setting, the RAW image file can have a plurality of pieces of processing-related information.

The determination in step S210 as to whether there is the processing-related information described above is made by determining whether the RAW image file includes a "processing-related information" block described above.

Description will be returned to the flowchart of FIG. 2.

When the control unit 101 determines in step S210 that there is no processing-related information in the RAW image file (NO in step S210), the processing proceeds to step S215. In step S215, the control unit 101 creates processing-related information in which the development parameters of the RAW image are set to default, and stores the information into the RAM 103 illustrated in FIG. 1.

In step S217, the control unit 101 sets "No info" (=0xFF) indicating that there is no display environment information at the time of image processing, and holds the information in the RAM 103. After step S217, the control unit 101 shifts the processing to step S230.

When the control unit 101 determines in step S210 that there is processing-related information (YES in step S210), the processing proceeds to step S220. In step 220, the control unit 101 performs a setting acquisition process for acquiring processing-related information from the RAW image file, and holds the acquired information in the RAM 103. When there is a plurality of pieces of processing-related information as illustrated in the example of FIG. 3C, the firstly found piece is read. Alternatively, the user may be allowed to select which processing-related information to read.

In step S225, the control unit 101 performs an environment acquisition processing for acquiring display environment information at the time of image processing from the processing-related information acquired in step S220, and holds the display environment information in the RAM 103. In the present exemplary embodiment, as the display environment information at the time of image processing, an "HDR display flag" indicating whether HDR display is enabled is acquired. After step S225, the control unit 101 shifts the processing to step S230.

In step S230, the control unit 101 performs a RAW image development processing. The development parameters used at the time of development are the HDR development parameters in the processing-related information held in the RAM 103. Then, an HDR image is obtained as a result of the development processing in step S230.

In step S235, the control unit 101 performs an environment acquisition process for acquiring the current display environment information. In the present exemplary embodiment, the control unit 101 inquires of the OS whether HDR display is enabled, and sets the "HDR display flag" based on a response from the OS. The HDR display flag is ON (=0x01) if HDR display is enabled, and the HDR display flag is OFF (=0x00) if HDR display is disabled. In this case, the OS is inquired as to whether HDR display is enabled as an example. However, other information may be acquired as a matter of course. For example, any information based on which it can be determined whether HDR display is enabled, such as maximum displayable luminance information or display gamma information, may be used. The control unit 101 acquires at least one of the HDR display flag, the information on the maximum luminance, and the information on the display gamma.

In step S240, the control unit 101 determines whether HDR display is enabled from the display environment acquired in step S235. When the HDR display is disabled (i.e., the HDR display flag is OFF (=0x00)) (NO in step S240), the control unit 101 shifts the processing to step S245. On the other hand, when HDR display is enabled (i.e., the HDR display flag is ON (=0x01)) (YES in step S240), the control unit 101 shifts the processing to step S255.

In the environment where the HDR display is disabled, that is, in the SDR display environment, the control unit 101 performs, in step S245, a process of converting the development result into an SDR image. In the present exemplary embodiment, the control unit 101 performs the conversion from the HDR image to an SDR image using, for example, tone mapping. As a matter of course, the control unit 101 may perform the conversion to an SDR image by other processing. There are several schemes to create an SDR image from an HDR image, but the scheme used does not matter.

In step S250, the control unit 101 performs a process of displaying, in SDR, the SDR image as the result of the conversion in step S245. After step S250, the control unit 101 shifts the processing to step S260.

In the environment in which HDR display is enabled, when the process proceeds to step S255, the control unit 101 performs a process of displaying an HDR image as the development result in HDR. After step S255, the control unit 101 shifts the processing to step S260.

In step S260, the control unit 101 determines whether the display environment at the time of image processing is different from the display environment at the time of display of the image processing result. The process in step S260 is a process for determining whether there is a difference between the display environment acquired in step S235 and the display environment acquired in step S225. If determining that the display environments are the same (i.e., no difference) (NO in step S260), the control unit 101 shifts the processing to step S270. However, if the display environment at the time of image processing is "No info" (=0xFF), the control unit 101 determines that there is no target to be compared, and shifts the processing to step S270. On the other hand, when determining that the display environments are different (YES in step S260), the control unit 101 shifts the processing to step S265.

In step S265, the control unit 101 causes the display 110 to display a message for notifying or warning the user that the display environments at the time of image processing and at the time of display of the image processing result are different from each other. In the present exemplary embodiment, a message is displayed as an example. However, any method may be used as long as notification to the user can be made. The notification may be made by at least one of displaying an icon for notification, displaying a mark for notification, outputting a sound for notification from an audio output device (not illustrated), displaying the display environment information at the time of image processing and at the time of display of the image processing results, and the like. When the display environments are different, the control unit 101 may operate to, after notifying the effect to the user, reset the processing-related information or return the processing-related information to the defaults.

In step S270, the control unit 101 determines whether the user has set values via the image processing control GUI by operating the operation input IF 105. In the present exemplary embodiment, brightness and color are set as image processing control via the GUI. As a matter of course, other settings may be applicable. When determining that the settings of the image processing control have been made through the GUI (YES in step S270), the control unit 101 shifts the processing to step S275. When determining that the settings of the image processing control have not been made (NO in step S270), the control unit 101 shifts the processing to step S280.

In step S275, the control unit 101 performs a process of updating the processing-related information stored in the RAM 103 to the information set by the user in step S270.

In step S277, the control unit 101 updates the display environment information at the time of image processing in the processing-related information stored in the RAM 103 to the information acquired in step S235. After step S277, the control unit 101 shifts the processing to step S280.

In step S280, the control unit 101 determines whether the user has pressed the end button by operating the operation input IF 105. When determining that the user has pressed the end button (YES in step S280), the control unit 101 shifts the processing to step S285. When determining that the end button has not been pressed (NO in step S280), the control unit 101 returns the process to step S230. As described above, in the present exemplary embodiment, steps S230 to S280 are repeated until the end of the application, whereby the user can repeat the image adjustments while checking the display image.

In step S285, the control unit 101 performs a process of reflecting the processing-related information stored in the RAM 103 on the RAW image file. In the present exemplary embodiment, if the processing-related information is read from the RAW image, the control unit 101 performs an overwrite process. If the processing-related information is not attached to the read RAW image, the control unit 101 performs an addition process on the RAW image. As a matter of course, even if the processing-related information is read from the RAW image, the control unit 101 may ask the user to confirm overwriting or adding the read processing-related information as other processing-related information to the RAW image file.

According to the first exemplary embodiment, the configuration and operation described above allows the user to recognize at the time of display whether there is a difference in displaying capability between the display environment at the time of image processing and the display environment at the time of display of the image processing result.

For example, it is assumed that the application (i.e., image processing program) of the present exemplary embodiment is executed and a user A performs image processing on a RAW image file. At this time, the user A uses the display 110 in SDR display environment. In this case, setting values and the like with which the user A has performed image processing are added to the RAW image file as processing-related information. Further, the display environment information of the display 110 of the user A is recorded in the RAW image file.

Thereafter, the user A passes, to a user B, a memory card or the like on which the RAW image file having undergone the image processing is recorded as described above, or sends the processed RAW image file via a network to a PC of the user B. Further, the PC display of the user B is capable of HDR display. In other words, the PC of the user B and the PC of the user A are different in displaying capability. Then, the user B also executes the application of the present exemplary embodiment on his/her PC and opens the RAW image file received from the PC of the user A. In this case, since the display environment at the time of image processing by the PC of the user A and the current display environment on the PC of the user B are different, a message or the like is displayed on the PC of the user B, notifying that there is a difference in displaying capability between the display environment at the time of image processing and the display environment of the image processing result. Accordingly, the user B can notice the possibility of a color tone being different from that at the time of image processing performed by the user A. As described above, in the present exemplary embodiment, when handling an HDR image to which processing-related information is added, the user can recognize that there is a difference between displaying capabilities in the display environments.

In a second exemplary embodiment, as in the first exemplary embodiment, an application that handles a RAW image file as an HDR image (i.e., image processing program) will be described as an example. Similarly to the application of the first exemplary embodiment, the application of the second exemplary embodiment can develop a RAW image file under the condition of outputting an HDR image. The application according to the second exemplary embodiment includes a file setting control, an image processing control, and an end button, as in the case described above. Further, as in the case described above, the image processing control allows settings of "brightness" and "color". Also in the present exemplary embodiment, an example in which processing-related information is recorded in a RAW image file. Related information may be recorded as a file separate from the RAW image file. In the present exemplary embodiment, the RAW image file is handled as an HDR image. However, instead of the RAW image, a general HDR image (e.g., a 10-bit image in BT.2020 color gamut with PQ gamma) may be used. The configuration of a PC as an application example of the image processing apparatus according to the second exemplary embodiment is the same as that illustrated in FIG. 1 described above, and thus the illustration and description thereof will be omitted.

Figure 4:
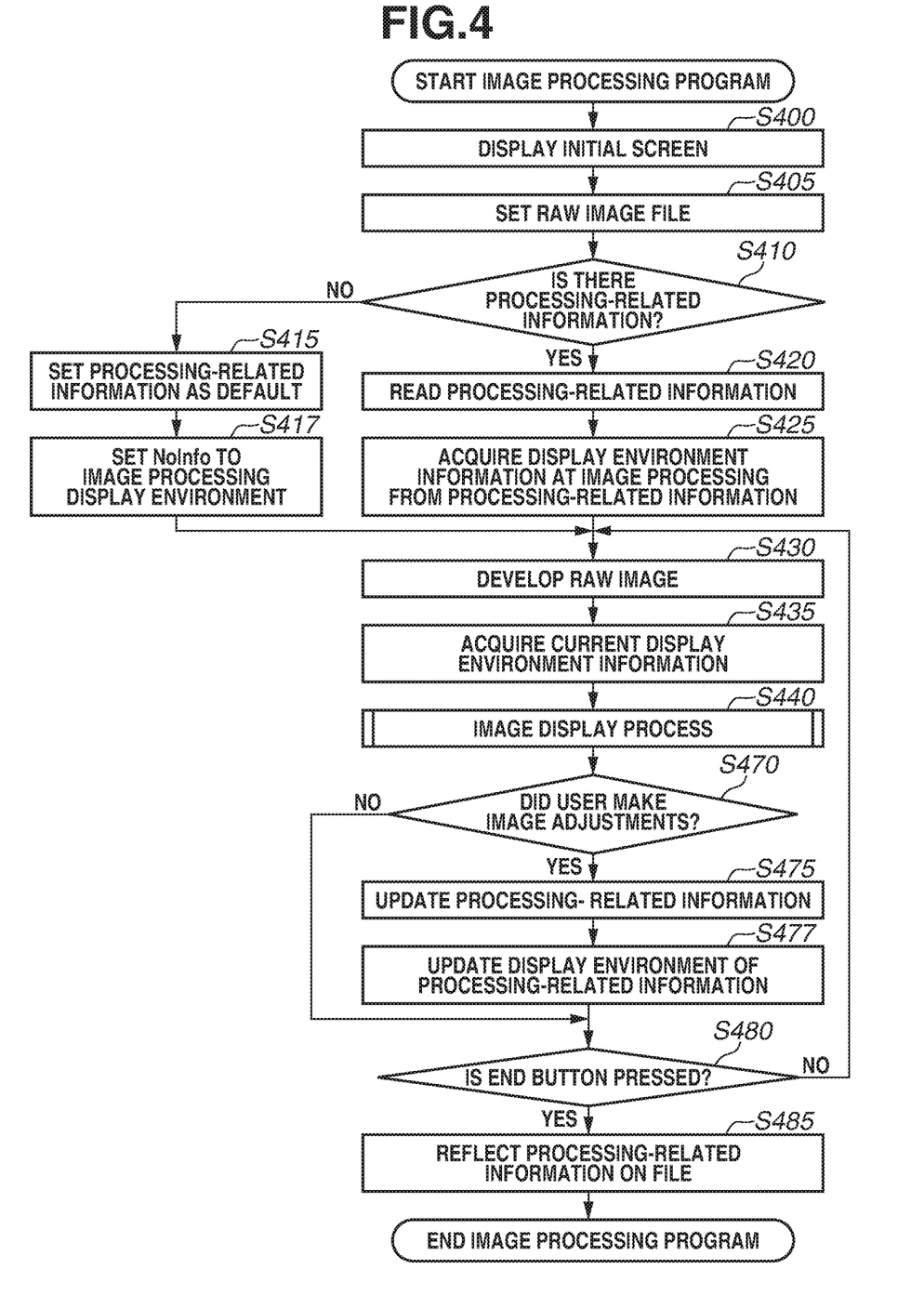
FIG. 4 is a flowchart illustrating a procedure performed based on an image processing program according to a second exemplary embodiment.

FIG. 4 is a flowchart illustrating a procedure of image processing of the second exemplary embodiment, which is implemented by the control unit 101 illustrated in FIG. 1 executing an image processing program as an application according to the present exemplary embodiment. Steps S400 to S435 illustrated in FIG. 4 are the same as steps S200 to S235 illustrated in FIG. 2, and steps S470 to S485 illustrated in FIG. 4 are the same as steps S270 to S285 illustrated in FIG. 2. Therefore, descriptions thereof will be omitted.

In the flowchart of FIG. 4, after step S435, the control unit 101 shifts the processing to step S440.

In step S440, the control unit 101 performs a process of displaying an image on the display 110. The image display process in step S440 will be described in detail with reference to the flowchart illustrated in FIG. 5.

Figure 5:
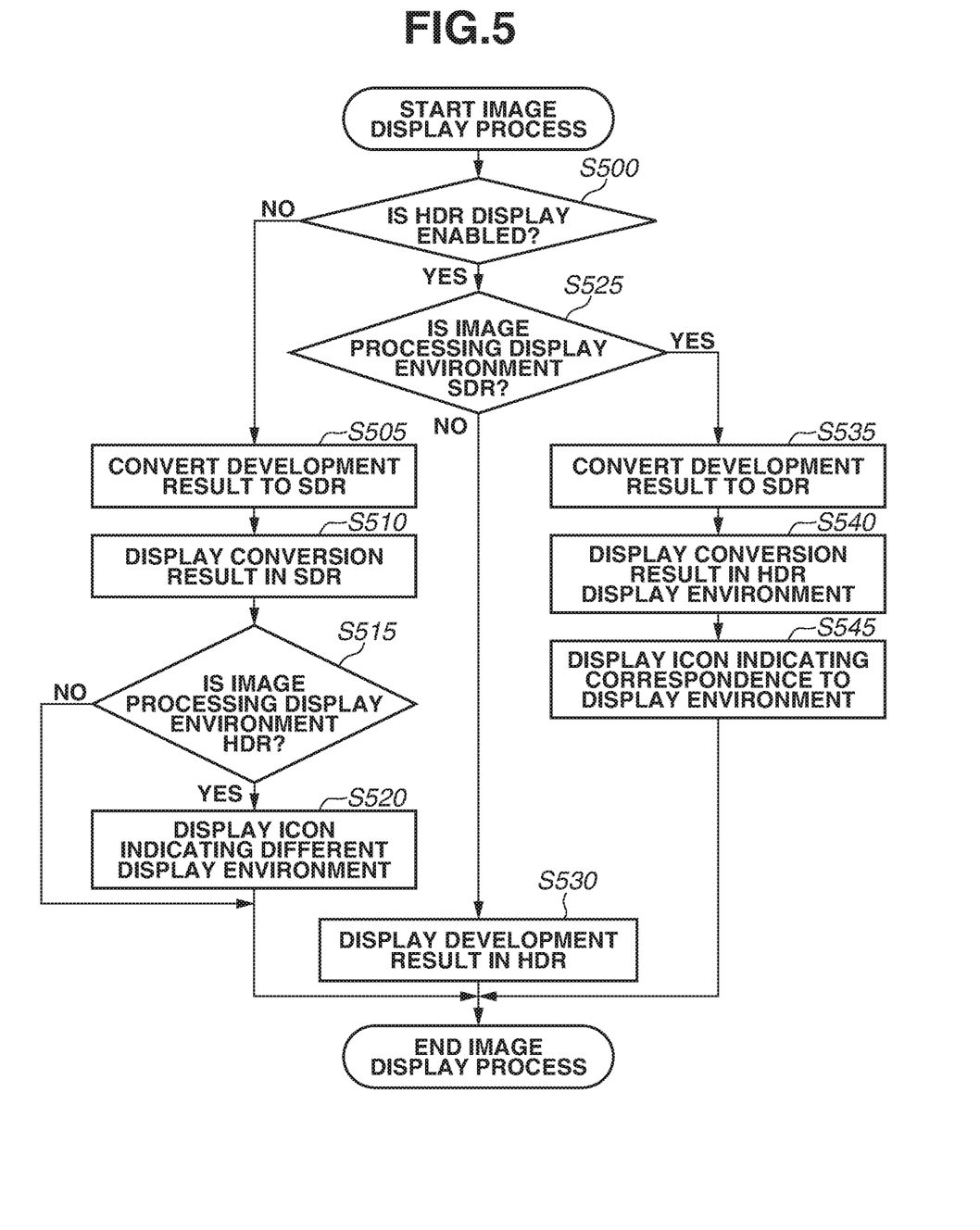
FIG. 5 is a flowchart illustrating an image display processing procedure according to the second exemplary embodiment.

In step S500, the control unit 101 determines whether HDR display is enabled from the display environment acquired in step S435. When determining that HDR display is disabled (i.e., SDR display environment and the HDR display flag is OFF (=0x00)) (NO in step S500), the control unit 101 shifts the processing to step S505. On the other hand, when determining that HDR display is possible (i.e., the HDR display flag is ON (=0x01)) (YES in step S500), the control unit 101 shifts the processing to step S525.

In the environment where the HDR display is disabled, that is, in the SDR display environment, the control unit 101 shifts the processing to step S505 to perform a process for converting the development result into an SDR image. In the present exemplary embodiment, the control unit 101 performs the conversion from the HDR image to an SDR image using tone mapping. As a matter of course, the control unit 101 may perform the conversion to an SDR image by other processing. There are several schemes to create an SDR image from an HDR image, but the scheme used does not matter.

In step S510, the control unit 101 performs a process of displaying, in SDR, the SDR image as the result of the conversion in step S505.

In step S515, the control unit 101 determines whether the HDR display flag of the display environment at the time of image processing is ON. If the HDR display flag of the display environment at the time of image processing is ON (=0x01) (YES in step S515), the control unit 101 shifts the processing to step S520. If the HDR display flag of the display environment at the time of image processing is not ON (i.e., 0x00 or 0xFF) (NO in step S515), the control unit 101 terminates the image display process illustrated in FIG. 5.

In step S520, the control unit 101 performs a process for displaying, in the SDR environment, the RAW image having undergone image processing in the HDR environment. In step S520, the control unit 101 superimposes, on the image, a mark [×], for example, indicating that there is a difference between displaying capabilities in the display environments, and then terminates the image display process. If the displaying capabilities are different, the control unit 101 may operate to, after notifying the effect to the user, reset the processing-related information or return the processing-related information to the defaults.

In step S525, the control unit 101 determines whether the HDR display flag of the display environment at the time of image processing is OFF. If the HDR display flag is other than OFF (i.e., 0x01 or 0xFF) (NO in step S525), the control unit 101 shifts the processing to step S530. On the other hand, if the HDR display flag is OFF (=0x00) (YES in step S525), the control unit 101 shifts the image display process to step S535.

In step S530, the control unit 101 performs a process in the case of handling a RAW image having undergone image processing in the HDR environment or in the case where the display environment at the time of image processing is "No info" (=0xFF). For example, when shifting the processing to step S530, the control unit 101 performs a process for displaying the HDR image as a development result in HDR, and terminates the image display process.

When shifting the processing to step S535, the control unit 101 performs a process of displaying, in the HDR environment, the RAW image having undergone image processing in the SDR environment. In step S535, the control unit 101 performs a process of converting the development result into an SDR image. In the present exemplary embodiment, the control unit 101 performs the conversion from the HDR image to an SDR image using tone mapping. As a matter of course, the control unit 101 may perform the conversion to an SDR image by other processing.

In step S540, the control unit 101 performs a process of displaying the SDR image as the result of the conversion in step S535. In other words, the control unit 101 produces the SDR display in the HDR display environment. Steps S535 and S540 are processes for displaying the image in SDR according to the display environment at the time of image processing even though the current display environment is the HDR display environment.

In step S545, the control unit 101 superimposes a predetermined mark (e.g., "!") on the image to indicate that the process for matching the display environments has been performed, and terminates the image display process. The predetermined mark "!" is a mark indicating that the image is displayed according to the display environment at the time of image processing although there is a difference between the display environments.

As described above, according to the second exemplary embodiment, steps S430 to S480 are repeated until the end of the application, whereby the user can repeat the image adjustments while checking the display image. Further, the user can recognize at the time of display whether the displaying capability is different between the display environment at the time of image processing and the display environment at the time of display of the image processing result. Furthermore, in the second exemplary embodiment, when handling an image having undergone image processing in the SDR environment, the image can be displayed even in the HDR display environment in the same dynamic range as that at the time of image processing.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-148447, filed Aug. 7, 2018, which is hereby incorporated by reference herein in its entirety.

What is claimed is:

1. An image processing apparatus comprising:
   a processing unit configured to perform image processing on an image with a predetermined dynamic range based on a setting inputted by a user;
   a setting acquisition unit configured to acquire information indicating the setting;
   a display unit configured to display the image having undergone the image processing on a display device in a display environment;
   an environment acquisition unit configured to acquire information indicating the display environment; and
   an output unit configured to associate the information indicating the setting and the information indicating the display environment with the image having undergone the image processing, and to output the image associated with the information indicating the setting and the information indicating the display environment,
   wherein the processing unit, the setting acquisition unit, the display unit, the environment acquisition unit, and the output unit are implemented via at least one processor.

2. The image processing apparatus according to claim 1, wherein the output unit includes a recording unit configured to record a file in which the information indicating the setting and the information indicating the display environment are associated with the image having undergone the image processing, wherein the processing unit, the setting acquisition unit, the display unit, the environment acquisition unit, the output unit and the recording unit are implemented via the at least one processor.

3. The image processing apparatus according to claim 1, wherein the image processing by the processing unit includes a process of developing a RAW image acquired by imaging into an image with the predetermined dynamic range.

4. The image processing apparatus according to claim 3, wherein the setting acquisition unit acquires information indicating a development condition of the RAW image in such a manner as to be included in the information indicating the setting.

5. The image processing apparatus according to claim 1, wherein the image processing by the processing unit includes a process of adjusting at least one of a color and a brightness of the image.

6. The image processing apparatus according to claim 5, wherein the setting acquisition unit acquires information on the adjustment in such a manner as to be included in the information indicating the setting.

7. The image processing apparatus according to claim 1, wherein the environment acquisition unit acquires at least one of information indicating whether the image with the predetermined dynamic range is displayable, information on maximum luminance, and information on display gamma in such a manner as to be included in the information indicating the display environment.

8. An image processing apparatus comprising:
   an image acquisition unit configured to acquire an image with a predetermined dynamic range which has undergone image processing based on a setting inputted by a user;
   a first acquisition unit configured to acquire processing-related information associated with the image, the processing-related information including information indicating the setting and information indicating a first display environment in which the image has been displayed on a first display device when the image processing is performed on the image;
   a display unit configured to display the image on a second display device different from the first display device in a second display environment;
   a second acquisition unit configured to acquire the information indicating a-the second display environment; and
   a notification unit configured to notify a difference between the first display environment and the second display environment,
   wherein the image acquisition unit, the first acquisition unit, the display unit, the second acquisition unit, and the notification unit are implemented via at least one processor.

9. The image processing apparatus according to claim 8, wherein the notification unit determines the difference between the first display environment and the second display environment, and, when determining that there is the difference, the notification unit notifies that there is the difference between the display environments.

10. The image processing apparatus according to claim 8, wherein the difference between the display environments is a difference between a display environment for displaying an image in the predetermined dynamic range and a display environment for displaying an image in a dynamic range narrower than the predetermined dynamic range.

11. The image processing apparatus according to claim 10, further comprising a processing unit configured to perform image processing on an input image, wherein when the first display environment is a display environment for displaying an image in the predetermined dynamic range and the second display environment is a display environment for displaying an image in the narrow dynamic range, the notification unit makes a notification for requesting resetting of the setting of the image processing on the image with the predetermined dynamic range, the display device displays an image obtained by converting the image with the predetermined dynamic range into the narrow dynamic range, the processing unit performs image processing based on the resetting made in response to the notification on the converted image with the narrow dynamic range, and wherein the first acquisition unit, the second acquisition unit, the notification unit, and the processing unit are implemented via at least one processor.

12. The image processing apparatus according to claim 10, wherein, when the first display environment is a display environment for displaying an image in the narrow dynamic range and the second display environment is a display environment for displaying an image in the predetermined dynamic range, the display device displays an image obtained by converting the image with the predetermined dynamic range into the narrow dynamic range.

13. The image processing apparatus according to claim 10, further comprising a processing unit configured to perform image processing on an input image, wherein when the first display environment is a display environment for displaying an image in the narrow dynamic range and the second display environment is a display environment for displaying an image in the predetermined dynamic range, the notification unit makes a notification for requesting resetting of the setting of the image processing on the image with the predetermined dynamic range, the display device displays the image with the predetermined dynamic range, the processing unit performs image processing based on the resetting made in response to the notification on the image with the predetermined dynamic range, and wherein the first acquisition unit, the second acquisition unit, the notification unit, and the processing unit are implemented via at least one processor.

14. The image processing apparatus according to claim 8, wherein the notification unit makes the notification for providing the information indicating the first display environment and the second display environment.

15. The image processing apparatus according to claim 8, wherein the notification unit makes the notification by at least one of display of a message, display of an icon, display of a mark, and output of sound.

16. The image processing apparatus according to claim 8, wherein the information indicating the display environment includes at least one of information indicating whether the image with the predetermined dynamic range is displayable, information on maximum luminance, and information on display gamma.

17. An image processing method comprising:
performing image processing on an image with a predetermined dynamic range based on a setting inputted by a user;
acquiring information indicating the setting;
displaying the image having undergone the image processing on a display device in a display environment;
acquiring information indicating the display environment; and
associating the information indicating the setting and the information indicating the display environment with the image having undergone the image processing, and outputting the image associated with the information indicating the setting and the information indicating the display environment.

18. An image processing method comprising:
acquiring an image with a predetermined dynamic range which has undergone image processing based on a setting inputted by a user;
acquiring processing-related information associated with the image, the processing-related information including information indicating the setting and information indicating a first display environment in which the image has been displayed on a first display device when the image processing is performed on the image;
displaying the image on a second display device different from the first display device in a second display environment;
acquiring the information indicating the second display environment; and
notifying a difference between the first display environment and the second display environment.

19. A non-transitory computer-readable storage medium storing a program for causing a computer to execute an image processing method, the program including instructions to:
perform image processing on an image with a predetermined dynamic range based on a setting inputted by a user;
acquire information indicating the setting;
display the image having undergone the image processing on a display device in a display environment;
acquire information indicating the display environment; and
associate the information indicating the setting and the information indicating the display environment with the image having undergone the image processing, and output the image associated with the information indicating the setting and the information indicating the display environment.

20. A non-transitory computer-readable storage medium storing a program for causing a computer to execute an image processing method, the program including instructions to:
acquire an image with a predetermined dynamic range which has undergone image processing based on a setting inputted by a user;
acquire processing-related information associated with the image, the processing- related information including information indicating the setting and information indicating a first display environment in which the image has been displayed on a first display device when the image processing is performed on the image;
display the image on a second display device different from the first display device in a second display environment;
acquire the information indicating the second display environment; and
notify a difference between the first display environment and the second display environment.

* * * * *